(12) United States Patent
Lee

(10) Patent No.: US 11,703,056 B2
(45) Date of Patent: Jul. 18, 2023

(54) PLASTIC PUMP, AND METHOD FOR MANUFACTURING SAME

(71) Applicant: FLUONICS CORP., Wonju-si (KR)

(72) Inventor: Sang Seon Lee, Wonju-si (KR)

(73) Assignee: FLUONICS CORP., Wonju-si (KR)

(*) Notice: Subject to any disclaimer, the term of this patent is extended or adjusted under 35 U.S.C. 154(b) by 433 days.

(21) Appl. No.: 16/849,801

(22) Filed: Apr. 15, 2020

(65) Prior Publication Data

US 2020/0248694 A1 Aug. 6, 2020

Related U.S. Application Data

(62) Division of application No. 14/759,413, filed as application No. PCT/KR2013/011745 on Dec. 17, 2013, now abandoned.

(30) Foreign Application Priority Data

Jan. 7, 2013 (KR) .................... 10-2013-0001433

(51) Int. Cl.
*F04D 1/04* (2006.01)
*F04D 29/42* (2006.01)
(Continued)

(52) U.S. Cl.
CPC .............. *F04D 1/04* (2013.01); *B29C 45/00* (2013.01); *B29C 45/14* (2013.01); *F04D 7/06* (2013.01);
(Continued)

(58) Field of Classification Search
CPC . F04D 1/04; F04D 7/06; F04D 29/026; F04D 29/4286; F04D 29/40; B29C 45/00;
(Continued)

(56) References Cited

U.S. PATENT DOCUMENTS 3,551,067 A * 12/1970 Wissman ............ F04D 29/4286
                                                           415/196
3,824,042 A *  7/1974 Barnes .................. F04D 29/047
                                                           415/176

(Continued)

FOREIGN PATENT DOCUMENTS

JP        06-299991      10/1994
JP        10-281096      10/1998
(Continued)

OTHER PUBLICATIONS

International Search Report and the Written Opinion dated Jan. 24, 2014 From the Korean Intellectual Property Office Re. Application No. PCT/KR2013/0117 45 and Its Translation Into English.

*Primary Examiner* — Dominick L Plakkoottam

(57) ABSTRACT

A plastic pump comprises a complete body having an inner body made of a fluorine resin and an outer body made of a plastic material by molding the plastic material in a first mold after fixing a pre-manufactured inner body to the first mold, an impeller made of a fluorine resin material by means of injection molding, and an impeller cover made of a plastic material by molding the plastic material in a second mold to protect the impeller, and a fluid transporting path is lined with the fluorine resin of the inner body.

8 Claims, 3 Drawing Sheets

(51) Int. Cl.
  *B29C 45/14* (2006.01)
  *F04D 7/06* (2006.01)
  *B29C 45/00* (2006.01)
  *F04D 29/02* (2006.01)
  *B29L 31/00* (2006.01)
  *B29K 27/12* (2006.01)

(52) U.S. Cl.
  CPC ....... *F04D 29/026* (2013.01); *F04D 29/4286* (2013.01); *B29K 2027/12* (2013.01); *B29L 2031/7496* (2013.01); *F05D 2300/43* (2013.01); *F05D 2300/44* (2013.01)

(58) Field of Classification Search
  CPC ............... B29C 45/14; B29K 2027/12; B29L 2031/7496; F05D 2300/43; F05D 2300/44
  See application file for complete search history.

(56) References Cited

U.S. PATENT DOCUMENTS

| | | | | |
|---|---|---|---|---|
| 3,829,238 A | * | 8/1974 | Speck | F04D 29/4286 415/197 |
| 4,052,133 A | * | 10/1977 | Yeater | F04D 29/026 415/214.1 |
| 4,722,664 A | * | 2/1988 | Wissman | F04D 29/026 415/197 |
| 4,850,818 A | * | 7/1989 | Kotera | F04D 13/027 416/241 A |
| 5,195,867 A | * | 3/1993 | Stirling | F04D 29/128 415/111 |
| 5,513,954 A | * | 5/1996 | Bourgeois | F04D 29/4286 415/196 |
| 5,767,198 A | * | 6/1998 | Shimizu | C08L 27/18 525/151 |
| 5,895,203 A | * | 4/1999 | Klein | F04D 13/026 415/142 |
| 5,993,176 A | | 11/1999 | Kingsford | |
| 6,074,166 A | | 6/2000 | Moddemeijer | |
| 7,101,158 B2 | * | 9/2006 | Hembree | F04D 13/027 417/420 |
| 2004/0184936 A1 | * | 9/2004 | Yanagihara | F04D 29/026 417/420 |
| 2010/0008768 A1 | * | 1/2010 | Vedsted | F04D 29/448 415/173.1 |
| 2010/0158703 A1 | * | 6/2010 | Hattori | F04D 29/046 425/588 |

FOREIGN PATENT DOCUMENTS

| | | | |
|---|---|---|---|
| JP | 2007-509654 | 4/2007 | |
| KR | 10-2009-0064719 | 6/2009 | |
| KR | 10-0915013 | 9/2009 | |
| KR | 10-2012-0024634 | 3/2012 | |
| WO | WO-9618822 A1 * | 6/1996 | ........... F04D 29/026 |
| WO | 2005/042064 | 5/2005 | |
| WO | 2014/106996 | 7/2014 | |

* cited by examiner

PLASTIC PUMP, AND METHOD FOR MANUFACTURING SAME

RELATED APPLICATIONS

This application is a divisional application of a U.S. patent application Ser. No. 14/759,413, filed on Jul. 7, 2015, which is a National Phase of PCT Patent Application No. PCT/KR2013/011745 having international filing date of Dec. 17, 2013, which claims the benefit of priority of Korean Patent Application No. 10-2013-0001433 filed on Jan. 7, 2013. The contents of the above applications are all incorporated by reference as if fully set forth herein in their entirety.

TECHNICAL FIELD

The present invention relates to a plastic pump, and a method for manufacturing the same, and in particular to a plastic pump, and a method for manufacturing the same wherein a fluid transporting path of the inside of a plastic pump is lined with a fluorine resin, so the plastic pump will not be easily deformed by temperature based on the kinds of fluids, and the plastic pump is strong to any chemical reaction with fluid.

BACKGROUND ART

In recent years, a plastic pump the weight of which is lighter than a steel product is being used more and more thanks to the benefits resulting from the decreased weight of the pump. In such a plastic pump, since a pump itself is made of a plastic material (PP, GFFRP), a fluid transporting path formed in the inside is also formed of only a plastic material.

If the fluid transporting path is formed of only a plastic material, the inside of the fluid transporting path may be easily deformed by the temperature based on the kinds (characteristics) of the fluid flowing through the fluid transporting path or may have a problem due to a chemical reaction with the fluid. In order to prevent such a problem, the whole materials of the plastic pump may be made of a fluorine material, but in this case the manufacturing costs a lot.

DISCLOSURE OF INVENTION

Accordingly, the present invention is made in an effort to resolve the above problems. It is an object of the present invention to provide a plastic pump and a method for manufacturing the same wherein only the fluid transporting path formed inside the plastic pump is lined with a fluorine resin, so the plastic pump is not easily deformed by temperature irrespective of the kinds of the fluids, and the plastic pump is strong to any chemical reaction with fluid.

To achieve the above objects, there is provided a method for manufacturing a plastic pump, which may include, but is not limited to a pre-manufacturing step wherein an inner body consisting of a fluorine resin material and forming a fluid transporting path and an impeller engaged to the inner body are previously manufactured through an injection mold method; a body manufacturing step wherein for manufacturing a complete body, in which the inner body consists of a fluorine resin and the outer body consists of a plastic material, by molding the plastic material in a first mold after fixing the pre-manufactured inner body to the first mold; a cover manufacturing step wherein for manufacturing impeller cover, which consists of a plastic material, by molding the plastic material in a second mold so as to protect the manufactured impeller; and a finishing step wherein for completing a plastic pump by sequentially assembling the manufactured complete body, the impeller and the impeller cover.

In addition, according to the method for manufacturing a plastic pump according to an exemplary embodiment of the present invention, the fluorine resin consists of PFA or PVDF, and the plastic material consists of PP, PVC or PPS.

In addition, according to the method for manufacturing a plastic pump according to an exemplary embodiment of the present invention, during the injection mold method with respect to the inner body and the impeller, a PFA, which is a fluorine resin material is injected in the injection mold at a pressure of 35~80 $kgf/cm^2$.

In addition, according to the method for manufacturing a plastic pump according to an exemplary embodiment of the present invention, the PFA, which is the fluorine resin material, has a temperature of 270° C.~420° C.

In addition, according to the method for manufacturing a plastic pump according to an exemplary embodiment of the present invention, the PVDF, which is the fluorine resin material, has a temperature of 170° C.~235° C.

In addition, according to the method for manufacturing a plastic pump according to an exemplary embodiment of the present invention, when mold-injecting the plastic material in the first mold, the injection is performed at a pressure of 35~80 $kgf/cm^2$.

In addition, according to the method for manufacturing a plastic pump according to an exemplary embodiment of the present invention, the inner body consisting of the fluorine resin(PFA or PVDF) material has a thickness of 1~10 mm.

In addition, the present invention is directed to a plastic pump which is manufactured by the above method for manufacturing a plastic pump.

Advantageous Effects

In the plastic pump manufactured according to the plastic pump and the method for manufacturing the same according to the present invention, only the fluid transporting path is lined with a fluorine resin, so the plastic pump is not easily deformed by temperature regardless of the type of the fluids, and is resistant to a chemical reaction with a fluid for improved product quality and significant extension of the period over which the pump can be used.

DESCRIPTION OF SPECIFIC EMBODIMENTS OF THE INVENTION

The most preferred embodiments of the present invention will be described with reference to the accompanying drawings to the extent that a person having ordinary skill in the art can easily implement. Throughout the description of the present invention, the same components will be given the same reference numbers, and duplicating descriptions may be omitted.

Hereinafter, the manufacturing procedures according to an exemplary embodiment of the present invention will be described in details with reference to FIGS. 1 to 5.

Figure 1:
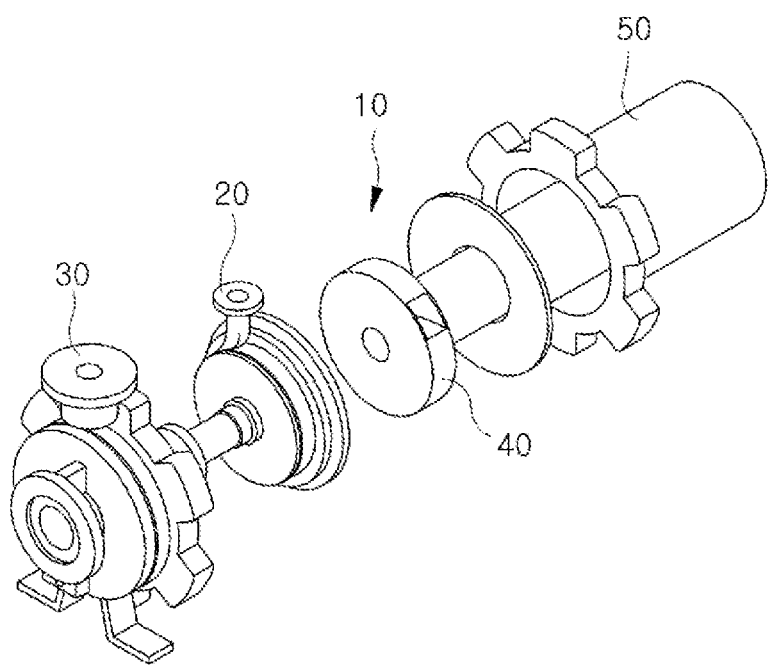
FIG. 1 is a schematic view illustrating a configuration of a plastic pump to an exemplary embodiment of the present invention may apply.
Figure 2:
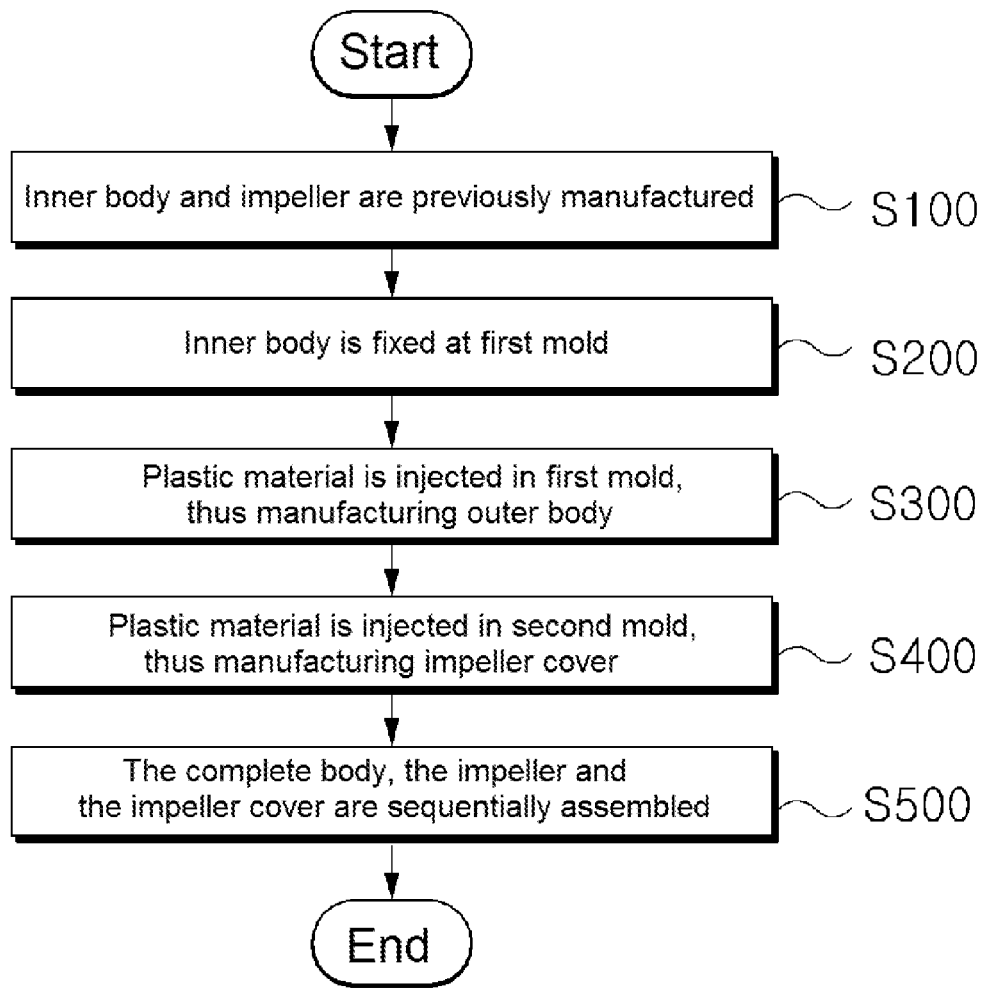
FIG. 2 is a step view for describing a manufacturing procedure of a plastic pump according to the present invention.
Figure 3:
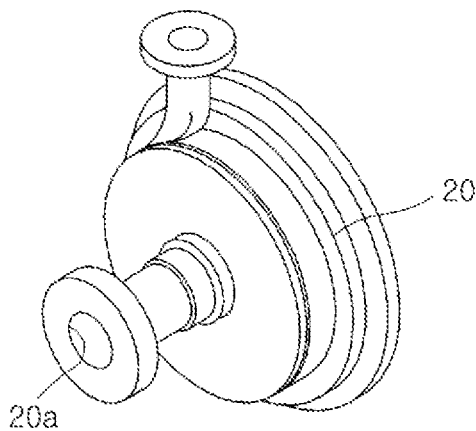
FIG. 3 is a view illustrating an inner body formed of a fluorine resin according to an exemplary embodiment of the present invention.
Figure 4:
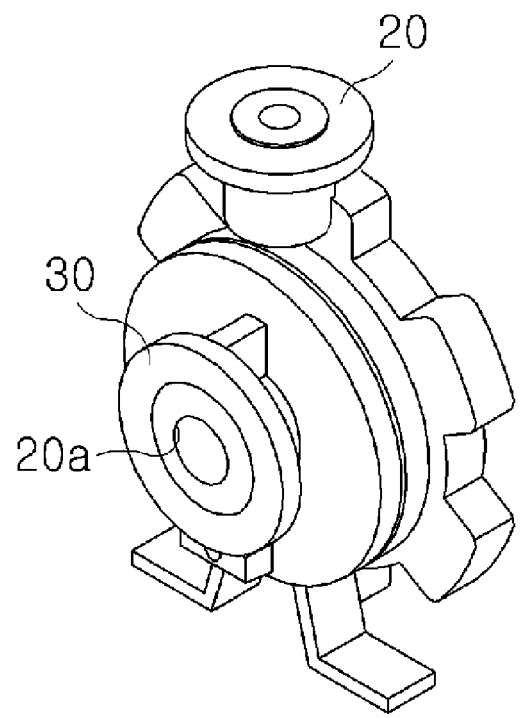
FIG. 4 is an example view illustrating an outer body made by injecting a plastic material in a first mold according to an exemplary embodiment of the present invention.
Figure 5:
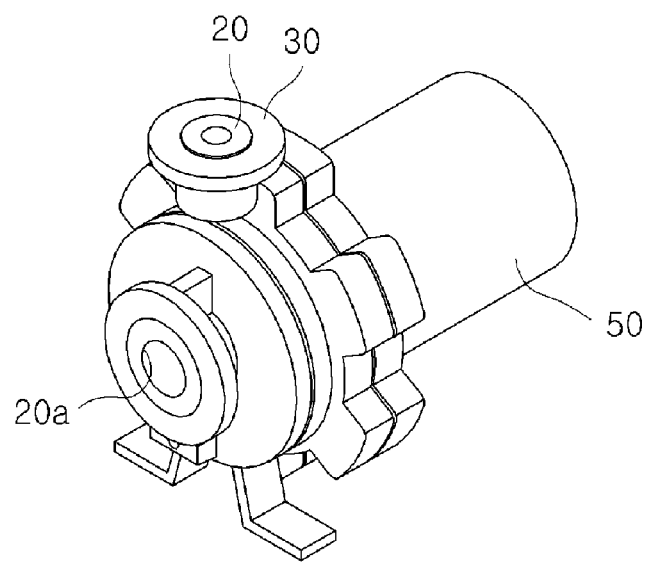
FIG. 5 is an example view illustrating a plastic pump assembled in a finishing step according to an exemplary embodiment of the present invention.

FIG. 1 is a schematic view illustrating a configuration of a plastic pump to an exemplary embodiment of the present invention may apply. FIG. 2 is a step view for describing a manufacturing procedure of a plastic pump according to the present invention. FIG. 3 is a view illustrating an inner body formed of a fluorine resin according to an exemplary embodiment of the present invention. FIG. 4 is an example view illustrating an outer body made by injecting a plastic material in a first mold according to an exemplary embodiment of the present invention. FIG. 5 is an example view illustrating a plastic pump assembled in a finishing step according to an exemplary embodiment of the present invention.

Referring to FIGS. 1 and 2, the plastic pump 10 according to the present invention may include, but is not limited to, an inner body 20, an outer body 30, an impeller 40 and an impeller cover 50.

The inner body 20 and the impeller 40 are previously made of a fluorine resin (PFA or PVDF) material through an injection mold method (S100). When the inner body 20 and the impeller 40 are made by the injection mold method, the PFA (PVDF), which is a fluorine resin material, is injected at a pressure of 35~80 kgf/cm² in the injection mold.

At this time, the PFA, which is a fluorine resin material, has a temperature of 270° C.~420° C., and the PVDF, which is a fluorine resin material, has a temperature of 170° C.~235° C. In addition, it is preferred that the inner body 20 consisting of a fluorine resin (PFA or PVDF) material has a thickness of 1~10 mm. An example of the configuration of the inner body 20 is illustrated in FIG. 3. In the inner body 20, a fluid transporting path 20a is formed of a fluorine resin. For this, even if chemical liquid flows through the fluid transporting path 20a, the inner surface of the inner body 20, namely, the inner surface of the fluid transporting path 20a does not go corroded and is chemically safe, thus improving the quality of the product.

Thereafter, the inner body 20 previously manufactured in the step S100 is fixed at a first mold (not illustrated) (S200), and a plastic material (PP or PVC or PPS) is injected in the first mold, so the complete body is manufactured, wherein the inner body 20 consists of a fluorine resin, and the outer body 30 consists of a plastic material (S300). During the injection mold, the plastic material is injected in the first mold at a pressure of 35~80 kgf/cm².

In case where the inner body 20 is formed of PFA, the outer body 30 may be formed of PP, PVC or PPS, but in case where the inner body 20 is formed of PVDF, it is preferred that the outer body 30 is formed of PP or PVC.

In order to protect the manufactured impeller 40, the plastic material (PP or PVC or PPS) is injected in the second mold (not illustrated), thus manufacturing an impeller cover 50 consisting of a plastic material (S400).

Thereafter, the manufactured whole bodies 20 and 30, the impeller 40 and the impeller cover 50 are sequentially assembled, and the plastic pump 10 is finished (S500).

At this time, since the injection is performed in the inner body 20, and then the outer body 30 is manufactured, the procedure for assembling the inner body and the outer body can be omitted in the following procedure.

The present invention made by the inventor has been described so far in details based on the exemplary embodiments, but the present invention is not limited thereto. Various modifications are available without departing from the scope of the present invention.

What is claimed is:

1. A plastic pump, comprising:
a complete body having an inner body made of a fluorine resin material and an outer body made of a first plastic material by injecting the first plastic material in a first mold after fixing the inner body to the first mold;
an impeller made of a fluorine resin material by an injection mold;
an impeller cover made of a second plastic material by molding the second plastic material in a second mold,
wherein a fluid transporting path is formed through the inner body consisting of the fluorine resin material and the outer body, the inner body and the outer body are integrally formed by the injecting the first plastic material, and extra assembling process of the inner body and the outer body is not necessary.

2. The plastic pump of claim 1, wherein the fluorine resin material of the inner body is different from the first plastic material of the outer body.

3. The plastic pump of claim 2, wherein the fluorine resin material of the inner body is PFA or PVDF, and the first plastic material of the outer body is PP, PVC or PPS.

4. The plastic pump of claim 3, wherein the PFA, which is the fluorine resin material of the inner body, has a melting temperature of 270° C. to 420° C.

5. The plastic pump of claim 3, wherein the PVDF, which is the fluorine resin material of the inner body, has a melting temperature of 170° C. to 235° C.

6. The plastic pump of claim 1, wherein the fluorine resin material of the impeller is different from the first plastic material of the outer body.

7. The plastic pump of claim 1, wherein the inner body made of the fluorine resin material has a thickness of 1 to 10 mm.

8. The plastic pump of claim 1, wherein the plastic pump is completed by sequentially assembling the complete body, the impeller and the impeller cover.

* * * * *